Oct. 12, 1965   R. S. WEBB ET AL   3,211,882
ELECTRICAL DISCHARGE MACHINING POWER CIRCUIT
Filed Aug. 22, 1962   2 Sheets-Sheet 1

INVENTORS.
Walter Lobur,
Robert S. Webb.
BY
Harry R. Dumont
ATTORNEY.

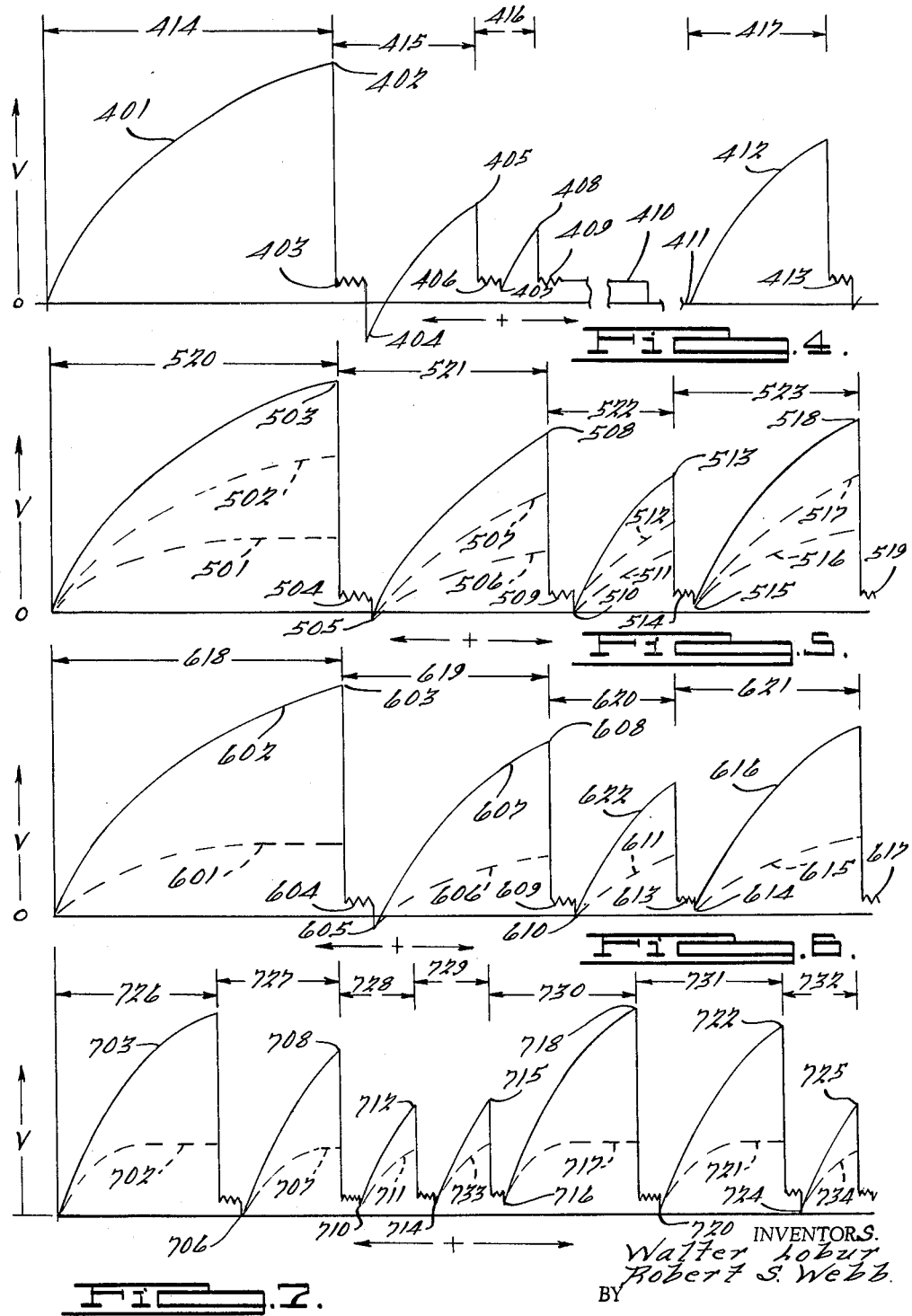

ELECTRICAL DISCHARGE MACHINING
POWER CIRCUIT
Robert S. Webb, Bloomfield Hills, and Walter Lobur, Clawson, Mich., assignors to Elox Corporation of Michigan, Troy, Mich., a corporation of Michigan
Filed Aug. 22, 1962, Ser. No. 218,754
14 Claims. (Cl. 219—69)

This invention relates generally to electrical discharge machining equipment and, more particularly, to a machining equipment and, more particularly, to a machining power circuit of the resistor condenser relaxation oscillator type.

Electrical discharge machining, sometimes referred to in the art as EDM, spark machining, or arc machining, is carried on by passing a series of discrete, localized, extremely high current density discharges across a gap between a conductive tool electrode and a workpiece at sonic or ultrasonic frequencies in the presence of a dielectric fluid for eroding the workpiece. The conductive tool is usually maintained in proximate position with respect to the workpiece by an automatic servo feel and is advanced toward or into the workpiece as stock is removed, therefrom. A fluid coolant, usually a liquid, is circulated through the working gap to flush the eroded particles from the gap and is sometimes furnished under pressure by a pump through a pattern of holes in the electrode. The defining characteristic of electrical discharge machining is that the coolant is a dielectric such as kerosene, transformer oil or pure water and is broken down in minute, localized areas by the action of the machining power supply between the closest points of the tool and work.

In the present state of the art, demands for a commercial machine containing the most reliable, inexpensive, trouble free circuitry have become of the utmost importance in electrical discharge machining. Machining power circuitry, such as that shown in Matulaitis and Lobur Patent No. 2,951,969, issued September 6, 1960, has come into usage in the industry. An example of a servo feed mechanism and the electronic circuitry for servo feed control is shown in Webb Patent No. 2,996,638, issued August 15, 1961.

Electrical discharge machining has advanced beyond simple considerations of machining circuitry and servo feed circuitry alone and has entered the realm of precisely controlled machining conditions and highly specialized circuitry for vastly improved performance. Machines having a metal removal rate of 20 cubic inches per hour and more are now commercially available, and advanced technology has led to vastly improved electrode wear ratio or improved tool life even at these higher metal removal rates. With the higher metal removal rates now possible, tool life has become the prime consideration of electrical discharge machining. Forms of such machining power circuits incorporating such considerations are shown in Robert S. Webb copending application, Serial No. 29,363, filed May 16, 1960 and Serial No. 45,336, filed July 26, 1960.

In those applications, particular forms of improved power circuitry are shown and a detailed explanation is given explaining the importance of each circuit. It is explained that when properly applied, substantial improvements in machine performance are obtained by superimposing a high voltage, low current striking voltage source upon a relatively low voltage, high current machining power source.

It is well known in the art that in order to produce successive overvoltage discharges, the machining power source must be somewhat in excess of 20 volts but may be as low as 40 volts or as high as 200 volts in open circuit voltage for the machining power portion of the circuit. Once a discharge is initiated, the gap voltage falls to approximately 15 volts until deionization of the gap is caused by a voltage lower than that and insufficient to sustain conduction.

By "striking voltage" is meant that gap peak voltage that exists for sufficient time just prior to each gap discharge to break down and ionize the dielectric filled gap, thereby causing the discharge. The time required for the dielectric break down is somewhat dependent upon the magnitude of voltage for a particular gap but is in the order of a microsecond. Transient voltages of much higher voltage and much shorter duration may exist across the gap without causing break down.

We have found that gap spacing or clear dielectric spacing may be enlarged by increasing the gap striking voltage. A typical dielectric fluid used in EDM has a dielectric strength of 250 volts per one thousandth inch. Therefor, a machine having an open circuit voltage of only 40 volts would theoretically be capable of breaking down a gap of only 0.00016 inch which represents an extremely close spacing virtually impossible to hold at the higher machining rates and improved surface finishes required today. A higher voltage superimposed on this low voltage, for example, 250 volts, is capable of breaking down a clear gap spacing of 0.001 inch. A striking voltage of 500 volts similarly would be capable of breaking down a clear dielectric spacing of 0.002 inch, and so on for any desired gap spacing. At these greater spacings, machining improves since the power feed can more easily maintain the wider gap distance. It is therefore, virtually imperative that means for operating at relatively wide gap spacing be provided in present day commercial machines. Other advantages of high striking voltage operation are explained in the above mentioned applications.

One form of modified RC circuit achieving somewhat improved results is shown in Teubner Patent No. 2,756,316, employing an inductance or complex impedance in the charging circuit.

Another form of modified RC circuit, called a spillover circuit, is shown in Matulaitis Patent No. 2,794,152, issued May 28, 1957, which discloses a novel method of accelerating the charging of the discharge capacitor while limiting the maximum voltage effective across the gap.

This invention relates particularly to a superimposed high striking voltage, resistor condenser relaxation oscillator circuit, known in the art as an RC circuit, in which a simple source of D.C., a resistor and condenser in conjunction with the gap form a natural oscillator without any additional complex electronic circuitry such as a pulser or a vacuum tube amplifier. Pulser circuitry, particularly those which include vacuum tube amplifiers, are extremely costly to build and require substantially more service than any form of RC machining power circuit.

Accordingly, it is the principal object of this invention to provide inexpensive, reliable superimposed high striking voltage circuitry having many of the advantages of more refined machining power circuitry and few of the disadvantages or limitations of a simple RC circuit.

Another object of this invention is to provide an improved machining power circuit in which a high striking voltage circuit is superimposed on a lower voltage machining power circuit.

A further object of this invention is to provide an improved superimposed striking voltage RC circuit in which the high striking voltage D.C. supply is directly connected to a low voltage D.C. supply, thereby eliminating problems of transients caused during high current high frequency machining.

Still another object is to provide a superimposed high striking voltage circuit combined with a spillover circuit having the advantages of both the spillover circuit and the superimposed high striking voltage circuit to provide a substantially improved operation.

Other objects and advantages will become apparent from the following specification, which taken in conjunction with the accompanying drawings, shows and describes preferred forms of practicing the invention.

In the drawings in which reference numerals have been used to designate like parts herein referred to:

FIG. 4 shows a typical voltage waveform in an improved gap relaxation oscillator circuit presently commercially available;

FIG. 5 shows a typical voltage waveform for the circuit of FIG. 1;

FIG. 6 shows a similar typical voltage waveform for the circuit of FIG. 2; and

FIG. 7 shows a typical voltage waveform for the circuit of FIG. 3.

Figures 1, 2, 3:
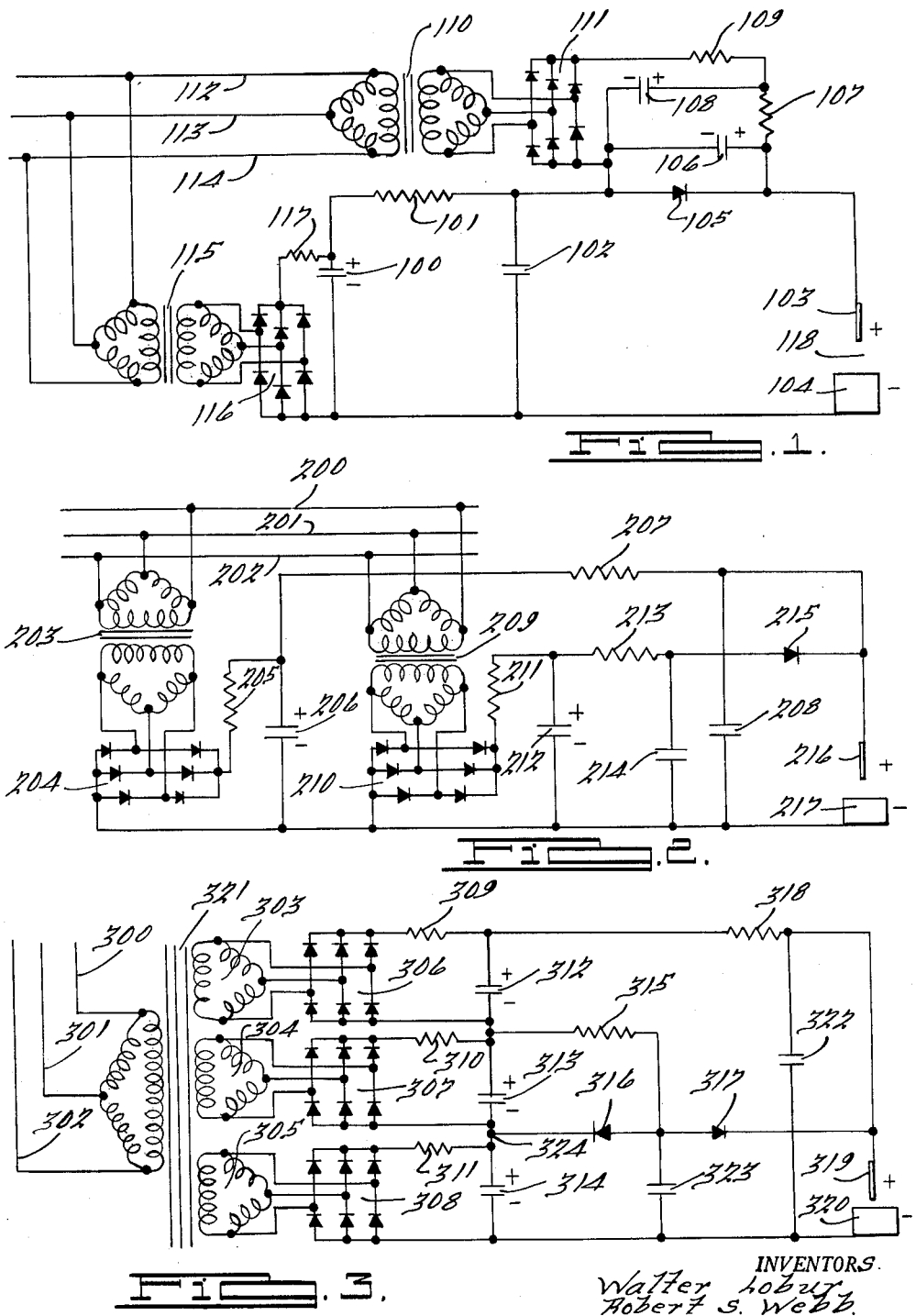
FIG. 1 is one form of superimposed high striking voltage circuit in which a low voltage, high current RC circuit is connected in series with a high voltage, low current RC circuit in a double RC circuit for producing a simultaneous discharge across the gap.
FIG. 2 is a modified superimposed high striking voltage RC circuit in which the high voltage circuit is in parallel with the low voltage circuit and performs in a manner somewhat similar to the FIG. 1 circuit except that the two voltages are not additive. Instead, the striking voltage at the gap is supplied by the high striking voltage circuit only until ionization occurs and a discharge results.
FIG. 3 is still another form of superimposed high striking voltage RC circuit in which the D.C. voltages are additive and are combined with a spillover voltage to produce an advanced form of superimposed high striking voltage RC circuit.

These latter four figures all have the same abscissa and ordinate and are drawn approximately to scale and show the relative improvements obtained by each of the circuits. In all four figures, voltage is shown on the ordinate and time is shown on the abscissa, and the waveforms shown represent typical oscillograms of these circuits.

Referring now to FIG. 1, it may be seen that input A.C. lines 112, 113 and 114 furnish three phase A.C. line voltage to polyphase transformers 110 and 115. Three phase transformer 115 has a relatively high stepdown ratio and is of much higher power capacity than transformer 110. The secondary of transformer 115 is of relatively low voltage, high current rating and in conjunction with three phase bridge rectifier 116, produces a pulsating D.C. output. Resistor 117 and large storage capacitor 100 filter this three phase output and furnish an idealized or nearly perfect D.C. source having extremely low internal impedance and relatively little ripple voltage. Capacitor 100 represents a bank of electrolytic capacitors of relatively high capacitance, at least 10 times larger than that of discharge capacitor 102.

The low voltage, high current portion of the circuit consists of capacitor 100, discharge capacitor 102 and charging resistance 101. Resistor 101 and capacitor 102 form an RC power circuit in conjunction with gap 118 in accordance with well known principles of RC discharge circuitry, and is capable of operating currents from a few milliamperes at frequencies approaching 500 kc. to 100 amperes or more at frequencies under 1 kc.

A three phase transformer 110 decouples and transforms the A.C. line voltage and furnishes A.C. power to a high voltage rectifier bank 111. This transformer and rectifier bank are of relatively higher voltage and much lower current capability and have a total power rating smaller than that of network 115–116. Surge resistor 109 and filter capacitor 108, are connected in the output of rectifier 111, producing at storage capacitor 106 high voltage, relatively ripple free, low impedance D.C. power.

The relationship between capacitor 108 and capacitor 106 is approximately the same as that of 100–102. Discharge capacitor 106 and charging resistor 107 form the superimposed high voltage RC circuit. Capacitor 106 is approximately 1/10 or less of the capacitance of 102 and resistor 107, 20 times the resistance of 101.

A rectifier 105 is connected in parallel with capacitor 106 and in blocking relationship with respect to the voltage stored across capacitor 108. This rectifier is of sufficient voltage rating to block the maximum voltage of capacitor 108 and of sufficient current rating to carry full machining current of the low voltage machining power circuit or discharge from capacitor 102 after ionization and breakdown of the gap. This rectifier of high voltage rating equivalent to the superimposed high striking voltage and high current rating equivalent to the low voltage high current machining power circuit, is the singular common characteristic of all superimposed high striking voltage circuits. The FIG. 2 circuit has an equivalent rectifier 215, and the FIG. 3 circuit an equivalent rectifier 317, each having the same relative ratings as will be seen from the description of operation of those circuits following.

Consider now the operation of the FIG. 1 circuit. Assuming the power circuit to be energized and the gap 118 between electrode 103 and workpiece 104 to be too large for discharge, capacitor 102 is fully charged through resistor 101 and capacitor 106 is fully charged through resistor 107. The total gap voltage is therefor the sum of voltages across capacitor 102 and capacitor 106 which are connected in series across the gap.

As the servo feed advances toward the workpiece, the gap becomes sufficiently small to permit breakdown of the dielectric fluid. Since the voltage across capacitor 106 is substantially higher than that of capacitor 102, the discharge is initiated primarily by capacitor 106, although in this circuit both discharge capacitors are connected in series. As the gap becomes ionized, electron flow is from capacitor 106 through capacitor 102, workpiece 104 and electrode 103 to the positive side of capacitor 106. Capacitor 106 discharges sharply, limited only by the internal impedance of the two series capacitors and the lead length impedance to the gap. Since capacitor 106 discharges completely and has a capacitance many times smaller than capacitor 102, comparatively little voltage change has taken place across capacitor 102 at that instant, and the discharge of capacitor 102 is continued through the gap by conducting through rectifier 105. Prior to discharge, capacitor 102 was charged to a voltage between approximately 30 and 80 volts and capacitor 106 charged to a voltage of approximately 100 to several thousand volts, if desired. As the gap ionizes, the voltage falls immediately across the gap to approximately 15 volts, thereby permitting both capacitors to discharge completely. After discharge of both capacitors, the charge-discharge cycle continues automatically at a frequency determined by the gap breakdown voltage and the RC networks.

The essential design consideration of the relationship between R101–C102 and R107–C106 is that the RC time constant of 101–102 be smaller than the time constant of 107–106. If this relationship is preserved, capacitor 102 will always be substantially charged at the instant that gap breakdown is caused by the superimposed voltage across capacitor 106. This relationship is essential to ideal operation as will be explained in an analysis of the voltage waveform of FIG. 5.

In the circuit of FIG. 1, the two voltages are connected in series, but, if the workpiece 104 is thought of as ground or earth potential, then the high voltage supply, represented by 110, 111, 109, 108, 107, 106, is floating from ground by the voltage across capacitor 102 and tends to produce capacitive leakage currents with respect to earth as capacitor 102 is rapidly discharged. These transient currents are many times smaller than the relative size of capacitor 102 and usually can be neglected. A circuit of this type is virtually mandatory where the benefits of high striking voltage are to be achieved with an RC power supply, since for any substantial machining power, extreme limits would be placed not only on the input power supply 115, 116, 117, 100, but on the power dissipating capacities of resistor 101. For example, typical machining currents are in excess of 100 amperes, and a superimposed high striking voltage in excess of 300 volts would result in 30 kilowatts or more of wasted power in resistor 101. The size and cost of such a resistor suitable for an RC type EDM circuit would be prohibitive but would become entirely practical when this method of superimposed circuitry is employed.

It will be understood from the above that the provision of a superimposed high striking voltage in connection with the regular gap voltage in EDM apparatus results, among other advantages, in greater stability of power feed operation because it permits the use of a wider gap. By making the gap spacing respond to the striking voltage rather than the lower machining voltage, the wider gap is maintained. However, this wider gap is readily ionized without high expenditure of power and the finish and accuracy of cut are not impaired.

In FIGURES 1, 2, and 3, the workpiece is in each case shown as being connected to the negative pole of the circuit and the tool electrode is shown connected to the positive pole. This is exactly reversed polarity of that normally and previously used. The reason for and the advantages of this reverse polarity shown in each of these figures is thoroughly explained in Webb copending Application Serial No. 45,336, filed July 26, 1960 and in the interest of brevity is not repeated here.

The circuitry of FIG. 2 is somewhat similar to FIG. 1 and includes the additional advantage that the D.C. voltage stored across each power capacitor and the transformer and rectifier networks are connected to a common or fixed D.C. reference, in this instance, the common negative terminals of capacitors 206 and 212, thereby eliminating the undesirable effects of transient capacitive currents as outlined in FIG. 1. Striking voltage transformer 203 obtains A.C. power from three phase lines 200, 201, 202 and develops on its secondary relatively high voltage, low current striking voltage. Bridge rectifier 204 and surge resistor 205 are provided for producing across D.C. storage capacitor 206 the high voltage, low current source required for the striking voltage supply. In order to have identical gap voltage conditions between FIG. 1 and FIG. 2, it is necessary that the voltage stored across capacitor 206 equal the sum of the voltages of capacitor 100 and 108 in FIG. 1. In that case, the two circuits will perform in a nearly identical manner.

Machining power transformer 209 similarly produces at its secondary relatively low voltage high current, and in conjunction with rectifier bank 210 and surge resistor 211, furnishes relatively ripple free D.C. power to storage capacitor 212. For equivalent performance, the voltage across capacitor 212 is equal to that of capacitor 100 in FIG. 1. Both capacitor 206 and capacitor 212 are electrolytic storage capacitors and may actually represent a bank of many such capacitors connected in parallel, just as in FIG. 1. Capacitors 214, 208, etc., may also each represent a bank of parallel connected capacitors.

In the circuitry of FIG. 2, discharge capacitor 208 forms the full open circuit gap voltage and is charged through resistor 207. Low voltage discharge capacitor 214 is charged through resistor 213. As the gap spacing becomes close enough for the voltage across capacitor 208 to breakdown the dielectric producing a discharge, high voltage capacitor 208 discharges directly through the gap. Instantly upon ionization, the gap voltage falls to approximately 15 volts which is well below the voltage stored on capacitor 214 and that capacitor in turn discharges through rectifier 215. In this manner, the gap discharge is initiated by the high voltage capacitor and instantly both capacitors discharge simultaneously through the gap. Just as in FIG. 1, rectifier 215 must have a sufficient voltage rating to block the full voltage of striking voltage supply 206 and a sufficient current rating to carry all of the machining current furnished from capacitor 212. This circuit has the additional advantage that both discharge capacitors discharge in parallel through the gap rather than in series, and the parallel loop impedance is, necessarily, less than the series loop impedance of FIG. 1. In FIG. 2, there are two parallel paths during discharge, the high voltage path being capacitor 208, workpiece 217, and electrode 216, and the low voltage discharge path being capacitor 214, workpiece 217, electrode 216, rectifier 215. The exact relationships of these voltages during charging and discharge through the gap is shown in FIG. 6 and explained in its accompanying description.

FIG. 3 is still another form of superimposed high striking voltage circuit and in some respects is superior to the previous two. In this circuit, the basic low voltage power circuit is of the spillover type. The advantages of a basic spillover circuit consisting of capacitor 314, capacitor 313, resistor 315, rectifier 316 are explained in detail in Matulaitis Patent No. 2,794,152, issued May 28, 1957, and are omitted here in the interest of brevity.

Transformer 321 serves the dual purpose of both the two transformers shown in the previous circuits. The transformer may, as a matter of choice in any of the circuits, have a single three phase primary and three separate three phase secondary networks, as shown in FIG. 3, as secondary networks 303, 304 and 305, or in fact, may be derived from single phase or some other form of polyphase power. In this instance, full machining power is furnished through three phase A.C. lines 300, 301 and 302, also equivalent to those of the previous figures. Bridge rectifier 308 and surge resistor 311 furnish D.C. power to capacitor 314. The A.C. input to this network is furnished from three phase secondary network 305. The D.C. voltage across capacitor 314 represents the maximum voltage of the low voltage machining power circuit and, in this form of spillover circuit construction, may be lower in voltage than that of equivalent capacitors 212 and 100.

D.C. spillover supply capacitor 313 is chosen in accordance with the design procedures set forth in the above mentioned Patent No. 2,794,152. Power is furnished to capacitor 313 from three phase secondary 304, bridge rectifier 307 and surge resistor 310.

Superimposed high striking voltage supply capacitor 312 is furnished power by three phase secondary 303, bridge rectifier 306 and surge resistor 309. The three capacitors 314, 313 and 312 are all connected in series producing an increasingly positive voltage with respect to workpiece 320.

On open circuit with the spacing between electrode 319 and workpiece 320 too great to be broken down by the sum of these three voltages, striking voltage capacitor 322 is charged through resistor 318 to the total voltage of the three series connected supplies. Low voltage discharge capacitor 323 is charged to the voltage of supply 314 through resistor 315. Charging electron flow for discharge capacitor 323 flows from supply 314 through capacitor 323, resistor 315, capacitor 313. As the voltage across capacitor 323 is charged equal to the voltage of supply 314, electron flow is drawn from center tap 324 through spillover rectifier 316, resistor 315, thereby limiting the voltage across capacitor 323 to the voltage of supply 314 and the minute additional drop of rectifier 316 in accordance with the principles set forth in the above mentioned U.S. Patent No. 2,794,152.

As the electrode is advanced toward the workpiece, and the gap is broken down by the voltage across capacitor 322, a discharge results in a manner identical to that of FIG. 2. The electrode voltage drops instantly to approximately 15 volts and similarly permits discharge of capacitor 323 through rectifier 317. This portion of the circuitry is identical to that of FIG. 2.

The principal improvement shown in FIG. 3 is the incorporation of the spillover circuit and the particular means of applying superimposed high striking voltage for use in spillover circuity. The combination of the spillover circuit and superimposed high striking voltage circuit produces an inexpensive, durable, improved form of circuitry vastly superior to a simple RC circuit and many times superior to a spillover type RC circuit alone and produces a circuit nearly equivalent in performance to many refined forms of pulser circuitry and yet having the advantages of RC circuitry of low cost and durability.

It should be noted that where the circuit parameters provide adequate leakage capacitance over diode 317 or sufficient capacitance across the gap, the circuit of FIG. 3 may be utilized without the inclusion of capacitor 322. Similarly, the circuits of FIGS. 1 and 2 may be operable without the inclusion of capacitors 106 and 208, respectively. As will be apparent to those skilled in the art, incorporation of the high striking voltage sources in the basic RC circuits of FIGS. 1–3 provides a greatly improved and novel mode of operation. This improvement is achieved independently of the circuit capacitance hereinabove referred to. The basic RC circuit in which a high striking voltage is imposed directly on a machining power pulse is of particular advantage when utilized with a power feed system of the type shown and described in the aforementioned U.S. Patent No. 2,996,638 in which gap striking voltage is utilized to control electrode positioning.

FIG. 4 shows a typical voltage waveform across the gap in a conventional RC circuit in which the voltage rises exponentially as the discharge capacitor is charged along charging curve 401. If the gap spacing is large, the gap does not break down, and a D.C. voltage equal to the supply voltage exists across the gap. In the example of FIG. 4, the voltage magnitude at 402 is sufficient to break down the gap. Upon ionization of the gap, the voltage falls instantly to approximately 15 volts and there continues for the duration of the discharge of the capacitor. This gap voltage is shown by magnitude 403. In a typical RC circuit, discharge of the capacitor from a relatively high magnitude such as 402 usually oscillates or overdischarges because of series inductance causing the discharge condenser to overdischarge and actually produce a negative polarity. This overdischarge is shown at point 404 and may be of sufficient magnitude to break down the gap in reverse. This condition is known as A.C. arcing and is extremely undesirable in that machining efficiency falls sharply and electrode wear increases. Furthermore, it is difficult for the gap to recover from this condition without going into a continuous or D.C. arc as shown for example along line 410. In this example, reverse polarity 404 is insufficient to cause reverse break down of the gap and the capacitor recharges to point 405. The charging slope between 404 and 405 is identical to that of 401 as is the slope from 407 to 408 and slope 412, respectively. In an RC circuit, a high voltage discharge is usually followed by a series of relatively lower voltage discharges. This is shown by the second gap break down occurring at point 405 which is lower in magnitude than 402. Again, as the gap breaks down, the voltage falls instantaneously to 406, which is the same arc voltage as shown at 403. Overdischarge of the capacitor from this lower voltage point causes the gap voltage to fall to point 407 which is insufficient to sustain gap conduction. Again the gap deionizes and the discharge condenser charges from point 407 to still lower voltage 408 at which time the gap breaks down again. As shown in this example, this minute overcharge of the capacitor is insufficient to cause the capacitor to overdischarge and the arc shown at 409 soon becomes a continuous arc as shown along line 410 because of the lack of sufficiently large inductive transients. During such a continuous arc, current passes directly from the power supply into the gap which sustains the arc voltage of approximately 15 volts for an indefinite length of time.

Frequently, burning of the workpiece or the electrode will produce localized expansion causing the electrode and work to contact in which a direct short circuit occurs as shown along line 411. This condition continues until this contact is broken by the servo feed which is of much lower frequency response than any of the previous pulses. At the time the short circuit is broken, the discharge capacitor resumes charging normally and the cycle again repeats itself as shown by charging curve 412 and arc voltage 413.

FIG. 4 shows a typical series of capacitor discharges and the types of malfunction that occur. The three extremely undesirable characteristics of this form of machining are: (1) the A.C. arc that can occur at point 404; (2) the continuous arc developed as along line 410; (3) the short circuit that occurs along line 411; each capable of causing severe damage to the electrode and workpiece and materially reducing electrode life. Notice the random nature of the period of the individual discharges in which the time duration between the discharge occurring from point 402 and that of 405 is represented as duration 415. The previous duration 414 and subsequent pulse durations 416 and 417 are again entirely random in nature and such time durations may vary by as much as a twenty to one difference in ratio. Each high voltage discharge, such as that from magnitude 402, produces a much rougher surface finish than the lower voltage discharges, such as 405 and 408. However, low voltage discharges are far less reliable and have a much greater tendency to break down into a continuous arc or short circuit.

Modifications heretofore developed for conventional RC circuits tend to reduce these undesirable characteristics somewhat and tend to decrease individual machining periods, such as 415 or 416 for the same machining current, but none of the aforementioned modifications improve machining of this relaxation oscillator form of arc discharge power circuit as much as any of the forms shown in FIGURES 1, 2 or 3.

The improved gap discharge characteristics of the FIG. 1 circuit are shown by the gap voltage waveform shown in FIG. 5. In FIG. 5, the basic charging curve of capacitor 102 is shown along 501. The additional charging curve of capacitor 106 is shown as curve 502. Charging curve 503 represents the sum of these two capacitor voltages as seen at the gap.

In a manner similar to that shown in FIG. 4, the gap breaks down at point 503 and falls instantaneously to the arc voltage 504. It should be noted at the point of breakdown, that capacitor 102 as represented by charging curve 501 is substantially charged. As the gap voltage falls below the voltage of curve 501, capacitor 102 also discharges into the gap and over-discharges somewhat as represented by point 505, causing extinction of the arc.

Again, as in FIG. 4, a high voltage discharge is frequently followed by several discharges of lower voltage magnitude as represented by gap break down voltages 508–513. In the second discharge, capacitor 102 charges along 506, capacitor 106 charges along line 507 and the gap voltage curve from point 505 to 508 represents the sum of these two charging curves. A similar breakdown occurs at point 508 resulting in gap discharge voltage 509 and extinction point 510.

Similarly, the third discharge in FIG. 5 occurs after capacitor 102 has charged along 511, capacitor 106 along line 512, the sum being represented by the curve from point 510 to 513. The voltage magnitude of discharge at 513 is shown as smaller than that of 508. Since capacitor 102 is somewhat charged at this time, overdischarge is still possible and arc 514 extinguishes at point 515 because of over-discharge of capacitor 102.

In this example, the charging curve from 515 to 518 now shows a higher voltage discharge, approximately equal to that of 505 to 508 in which recovery from the low voltage condition has been complete and the cycle now becomes randomly repetitive. In the fourth discharge of FIG. 5, charging curve 516 is approximately equal to that of curve 506 and curve 517 approximately equals charging curve 505 and striking voltage 518 approximately equals 508 showing complete recovery from the low voltage condition.

The outstanding improvement provided by the circuit of FIG. 1 over conventional RC circuits is the elimination of continuous arcs shown in FIG. 4 at 410 or short circuits as shown at 411, whereby machining conditions are materially improved.

The individual pulse periods of this form of machining tend to be somewhat longer in duration than an equivalent conventional RC circuit. This tendency is intentional so that power discharge capacitor 102 is substantially charged between each pulse as chosen by the charging time constant of the superimposed voltage occurring across capacitor 106, as described above. Thus, the average time periods represented by 520, 521, 522 and 523 are somewhat longer than the average of 414, 415, 416, and 417. The elimination of continuous arcs and short circuits vastly improves the overall surface finish and machine performance.

FIG. 6 is a gap voltage waveform of the circuitry of FIG. 2 and is almost identical to that of FIG. 5 in which charge of the power discharge capacitor 214 is shown along curves 601, 606, 611 and 615, and the gap voltage which is identical to that of the charge of capacitor 208 is shown as curves 602 rising to voltage 603, 607 rising to voltage 608, 622, and 616. The principal difference in this case is that the voltage across capacitor 208 and the gap voltage are identical and are not in this case the sum of two separate voltages. Similar gap discharges are shown at 604, 609, 613, and 617 respectively. Overdischarge of the capacitor causes the arc to extinguish at point 605, 610, and 614 resulting in individual pulse durations 618, 619, 620, and 621 respectively. To demonstrate the similarity between the two circuits, the voltage magnitudes are shown as being equal. As mentioned above, in order to achieve an equivalent gap voltage, the voltage of the FIG. 2 circuit striking voltage capacitor 206 must be equal to the sum of voltages across capacitor 100 and 108 shown in FIG. 1.

By far the most improved form of machining occurs with the FIG. 3 circuit resulting in the typical voltage waveform shown in FIG. 7. In the circuitry of FIG. 3, not only is the tendency of continuous arcs or short circuits virtually eliminated but the average period of discharge is greatly reduced, producing much higher machine performance and much improved surface finish for the same metal removal rate.

In FIG. 7, curves 702, 707, 711, 733, 721, and 734, show the charging curve of the power discharge capacitor 323. High voltage charging curve 703 and the curves between 706, 708; 710, 712; 714, 715; 716, 718; 720, 722; 724 and 725 represent the charging curves of striking voltage capacitor 322 and are quite similar in magnitude to the corresponding charge curves of FIG. 6. The individual time periods as indicated by 726, 727, 728, 729, 730, 731 and 732 are substantially shorter than those of FIG. 6.

The essential difference in the two figures is the much sharper charging characteristic now possible because of the included spillover circuit connected to the low voltage capacitor in the circuit of FIG. 3. Since charging of the low voltage capacitor is accelerated and therefore of shorter duration, the corresponding charging time constant of capacitor 322, resistor 318, may be correspondingly smaller. This smaller average time constant results in a finer surface finish at the same machining rate or correspondingly in a much higher machining rate for the same surface finish. Again, with reference to FIG. 4, the tendency of continuous arcs or short circuits is virtually eliminated by the superimposed high striking voltage circuit and the relationship of the time constant between the high voltage circuit and the low voltage circuit as outlined above.

By way of summary, we have provided novel electrical discharge machine power circuitry which incorporates a superimposed striking voltage network of the resistor condenser relaxation oscillator type. Furthermore, we have provided machining power circuitry which advantageously combines such a circuit with a spillover network. It should be noted that the circuits of the present invention employ exclusively two terminal electrical components such as capacitors, resistors, rectifiers, and the like which provide both durability and reliability of operations.

We claim:

1. In an apparatus for removing material from a conductive workpiece by electrical discharge, a machining power circuit comprising an electrode spaced from the workpiece by a dielectric filled gap, a first source of D.C., a first resistor and a first capacitor connected across said first source, said first capacitor connected across the gap, a second source of D.C., a unidirectional current conducting device connected across said second source, and in series with said first source and the gap, a second resistor, and a second capacitor coupled across said second source, said second capacitor connected across said second source and operable to ionize the gap and initiate the discharge of said first capacitor.

2. In an apparatus for removing material from a conductive workpiece by electrical discharge, a machining power circuit comprising an electrode spaced from the workpiece by a dielectric filled gap, a first source of D.C., a first impedance and a first energy storage device connected across said first source, said first energy storage device connected across the gap, a second source of D.C. of substantially greater voltage than said first source connected in series with said first source and said gap, a unidirectional current conducting device connected across said second source, a second impedance, and a second energy storage device coupled across said second source and operable by its discharge to initiate the discharge of said first storage device, and means connected between said first source of D.C. and said first storage device for accelerating the charging of said first storage device.

3. The combination as set forth in claim 1 in which the charge time constant of said first resistor and capacitor is substantially smaller than the charge time constant of said second resistor and capacitor.

4. The combination as set forth in claim 1 in which each of said sources of D.C. includes an electrolytic storage capacitor charged through a surge limiting impedance by a rectified A.C. voltage.

5. The combination as set forth in claim 4 in which said electrolytic capacitors are connected in additive series.

6. The combination as set forth in claim 1 in which the voltage across said first capacitor is accelerated and limited by a spillover circuit.

7. Electrical discharge machining power circuitry comprising an electrode spaced from a conductive workpiece by a dielectric filled gap, a first, a second, and a third storage capacitor connected in series, means for supplying rectified A.C. power to each of said storage capacitors for charging said capacitors in series additive relationship, a first discharge capacitor and a first charging resistor connected across said first and second storage capacitors, a first rectifier connected between the junction of said first and second storage capacitors and the junction of said first discharge capacitor and its charging resistor, said first discharge capacitor connected across the gap between said electrode and the workpiece, a second rectifier in the lead connected from said second mentioned junction to the gap and oppositely poled from said first rectifier, a second discharge capacitor connected directly across the gap and across said first, second and third storage capacitors, and a second charging resistor connecting said second discharge capacitor to the output of said third storage capacitor permitting simultaneous discharge of both of said discharge capacitors through the gap.

8. In an apparatus for removing material from a conductive workpiece by electrical discharge, a machining power circuit comprising an electrode spaced from the workpiece by a dielectric filled gap, a first network comprising a relatively low voltage D.C. source including a first transformer secondary winding, a relatively low value impedance of high current capability and a high value capacitor of low voltage capability connected across said source and across the gap through a rectifier, and a second network comprising a relatively high voltage D.C. source, a relatively high value impedance of lower current capability and a low value capacitor of high voltage capability connected across the gap, said second network being operable to ionize the gap between said electrode and the workpiece and to initiate the discharge of said high voltage capacitor and said low voltage capacitor simultaneously through the gap, said low voltage capacitor having the voltage thereacross accelerated and limited by a spillover circuit, said spillover circuit including an output from an additional secondary winding and an oppositely poled rectifier connected between said output and said first mentioned rectifier.

9. Electrical discharge machining power circuitry including a relatively low voltage, high current source of direct current including a transformer secondary winding, a first charging resistor and a first discharge capacitor connected across said source, means connecting said capacitor across a dielectric filled gap between an electrode and a workpiece including a rectifier, a relatively high voltage, lower current source of direct current, a second charging resistor and a second discharge capacitor connected across said high voltage source, said high voltage source operable to ionize the gap and initiate the simultaneous discharge of both said capacitors through the gap, said first capacitor having the voltage thereacross accelerated and limited by a spillover circuit, said spillover circuit including an intermediate output from said transformer secondary winding and an oppositely poled rectifier connected between said output and said first mentioned rectifier.

10. In an electrical discharge machining apparatus for machining a conductive workpiece by intermittent electrical discharge across a gap between an electrode and the workpiece in the presence of a dielectric coolant, a first relaxation oscillator including a first D.C. source, a first capacitor and the gap, a second relaxation oscillator including a second D.C. source and a second capacitor superimposed on the gap to provide higher striking voltage for initiating gap ionization and the operation of said first relaxation oscillator.

11. The combination as set forth in claim 10 in which the charge time constant for said first capacitor is substantially smaller than the charge time constant for said second capacitor.

12. The combination as set forth in claim 10 in which said first source is of relatively low voltage, high current and in which said second source is of relatively high voltage, low current.

13. The combination as set forth in claim 10 in which said second capacitor is connected in series with said first capacitor across said gap.

14. The combination as set forth in claim 10 in which said first capacitor is connected in series with a rectifier across said gap and said second capacitor is connected across said rectifier.

References Cited by the Examiner

UNITED STATES PATENTS

| | | | |
|---|---|---|---|
| 2,273,819 | 2/42 | Cooke et al. | 219—69 |
| 2,756,316 | 7/56 | Teubner | 219—69 |
| 2,794,152 | 5/57 | Matulaitis | 315—171 |
| 2,835,785 | 5/58 | Williams | 219—69 |
| 2,892,072 | 6/59 | Miller | 219—137 X |
| 2,951,969 | 9/60 | Matulaitis et al. | 216—69 X |
| 2,996,638 | 8/61 | Webb | 216—69 X |
| 3,052,817 | 9/62 | Branker | 219—69 X |

RICHARD M. WOOD, *Primary Examiner.*